United States Patent [19]
Netzler

[11] Patent Number: 5,801,506
[45] Date of Patent: Sep. 1, 1998

[54] METHOD AND DEVICE FOR CONTROL OF AGV

[75] Inventor: Göran Netzler, Åsa, Sweden

[73] Assignee: Apogeum AB, Saro, Sweden

[21] Appl. No.: 581,538

[22] PCT Filed: Jul. 18, 1994

[86] PCT No.: PCT/SE94/00696

§ 371 Date: Feb. 23, 1996

§ 102(e) Date: Feb. 23, 1996

[87] PCT Pub. No.: WO95/03567

PCT Pub. Date: Feb. 2, 1995

[30] Foreign Application Priority Data

Jul. 22, 1993 [SE] Sweden ............... 9302475

[51] Int. Cl.$^6$ .............. G05D 1/00; G05D 1/02; G05D 1/03
[52] U.S. Cl. .......... 318/587; 318/568.1; 180/167; 180/169; 901/1; 364/443; 364/424.01
[58] Field of Search .................. 318/560–696, 318/139; 901/1; 180/167–169; 44/343, 273, 347, 399, 608, 665, 785, 274, 275; 701/22–28; 364/443, 424.01, 424.02, 424.06

[56] References Cited

U.S. PATENT DOCUMENTS

| | | | |
|---|---|---|---|
| 4,328,545 | 5/1982 | Halsall et al. | 364/424 |
| 4,593,238 | 6/1986 | Yamamoto | 318/587 |
| 4,593,239 | 6/1986 | Yamamoto | 318/587 |
| 4,716,530 | 12/1987 | Ogawa et al. | 364/424 |
| 4,736,812 | 4/1988 | Livneh | 180/168 |
| 4,764,078 | 8/1988 | Neri | 414/273 |
| 4,815,840 | 3/1989 | Benayad-Cherif et al. | 356/1 |
| 4,855,717 | 8/1989 | Hafner | 340/556 |
| 4,933,864 | 6/1990 | Evans, Jr. et al. | 364/449 |
| 4,947,094 | 8/1990 | Dyer et al. | 318/587 |
| 4,950,118 | 8/1990 | Mueller et al. | 414/274 |
| 4,968,209 | 11/1990 | Noble | 414/343 |
| 4,979,113 | 12/1990 | Roberts et al. | 364/424.02 |
| 4,982,329 | 1/1991 | Tabata et al. | 364/424.02 |
| 4,986,384 | 1/1991 | Okamoto et al. | 180/167 |
| 5,537,017 | 7/1996 | Feiten et al. | 318/587 |

FOREIGN PATENT DOCUMENTS

| | | |
|---|---|---|
| 412 653 | 3/1980 | Sweden . |
| WO 90/02987 | 3/1990 | WIPO . |
| WO 90/11561 | 10/1990 | WIPO . |

*Primary Examiner*—Paul Ip
*Attorney, Agent, or Firm*—Adams Law Firm, P.A.

[57] ABSTRACT

A method and a system for controlling an AGV for route selection upon transfer between different spaces within which the AGV is movable. The spaces are not fixedly related to each other with reference to their relative positions and are restricted from each other by the inclusion of area boarder lines. When an AGV is present within a first of the spaces, it detects for the purpose of transfer of the spaces, the relative position of the space by two reference instruments belonging to the second space. Each of the reference instruments is fixedly related to the present space. The AGV will move over the area border lines between the two spaces selecting route depending on calculating relative position.

8 Claims, 2 Drawing Sheets

METHOD AND DEVICE FOR CONTROL OF AGV

This application is a national stage application, according to Chapter II of the Patent Cooperation Treaty. This application claims the priority date of Jul. 22, 1993, Swedish Patent No. 9302475-0.

TECHNICAL FIELD AND BACKGROUND OF THE INVENTION

The present invention relates to a method and a device for controlling AGV according to the preamble of the enclosed claims 1 and 5 respectively.

There is a widespread demand for rationalization of e.g. cargo handling during trans-shipment from one means of transport to another. This applies to unloading and loading of ships, railway cars, lorrys, containers, aircraft etc. To this end, experiments have been made using Automatically Guided Vehicles, or AGV, which, so far, has demanded an adversely high precision in positioning of the mobile work area, onto which cargo is to be loaded or from which it is to be unloaded.

Generally, this is a problem comprising a number of as such known "spaces" with unknown relative positions, which has meant an obstacle when trying to automate activities to be performed within and between these spaces.

From e.g. WO 90/11561 it is previously known to use AGV for automatic loading and unloading of cargo-carrying vehicles, which are parked at a loading platform or other fixed loading space substantially level with the mobile loading space of the vehicle. As is evident from the known solution, it is necessary that the vehicle has been connected to the loading platform with a relatively high precision. This is because the known loading platform is quipped with photo detectors which sense that reflectors on the load-carrying vehicle are located at a fixed longitudinal as well as angular position relative to the loading platform. The system indicates that the mobile loading area is in a predetermined position relative to the fixed loading area, in which case a "ready" signal is transmitted to the AGV for unloading of the mobile load area. Not until the AGV has passed to the mobile load area, will the navigation, including the position determination of the AGV, be achieved by means of a plurality of reference devices inside the loading area.

The known system has, for it's function, to consider the mobile work area or space as a part of the stationary work area or space, i.e. the mobile space must have an orientation which is fixed relative to the stationary space so that the mobile space forms a part of the stationary space.

The known system described above will certainly tolerate some smaller deviations from an ideal position, but in practice demands that the mobile space is positioned with a high accuracy. A change in the position of the mobile space during on-going loading and unloading may bring about that said space will fall outside of the system tolerances. These disadvantages thus entail time needs for position adaptation and/or costs for special adaptation equipment.

SUMMARY OF THE INVENTION

The object of the present invention is to provide a method and a device, by which the above drawbacks are eliminated, so that considerably larger positional and angular deviations between different work areas or spaces for AGV are tolerated, whereby the needs for special devices in order to allow automatic loading and unloading are eliminated.

Said object is achieved by a method and a device according to the present invention, the characteristics of which will be apparent from the enclosed patent claims 1 and 2 respectively.

BRIEF DESCRIPTION OF THE DRAWINGS

The invention will be further described by way of an embodiment example and with reference to the enclosed drawings, in which.

DESCRIPTION OF THE PREFERRED EMBODIMENT AND BEST MODE

Figure 1:
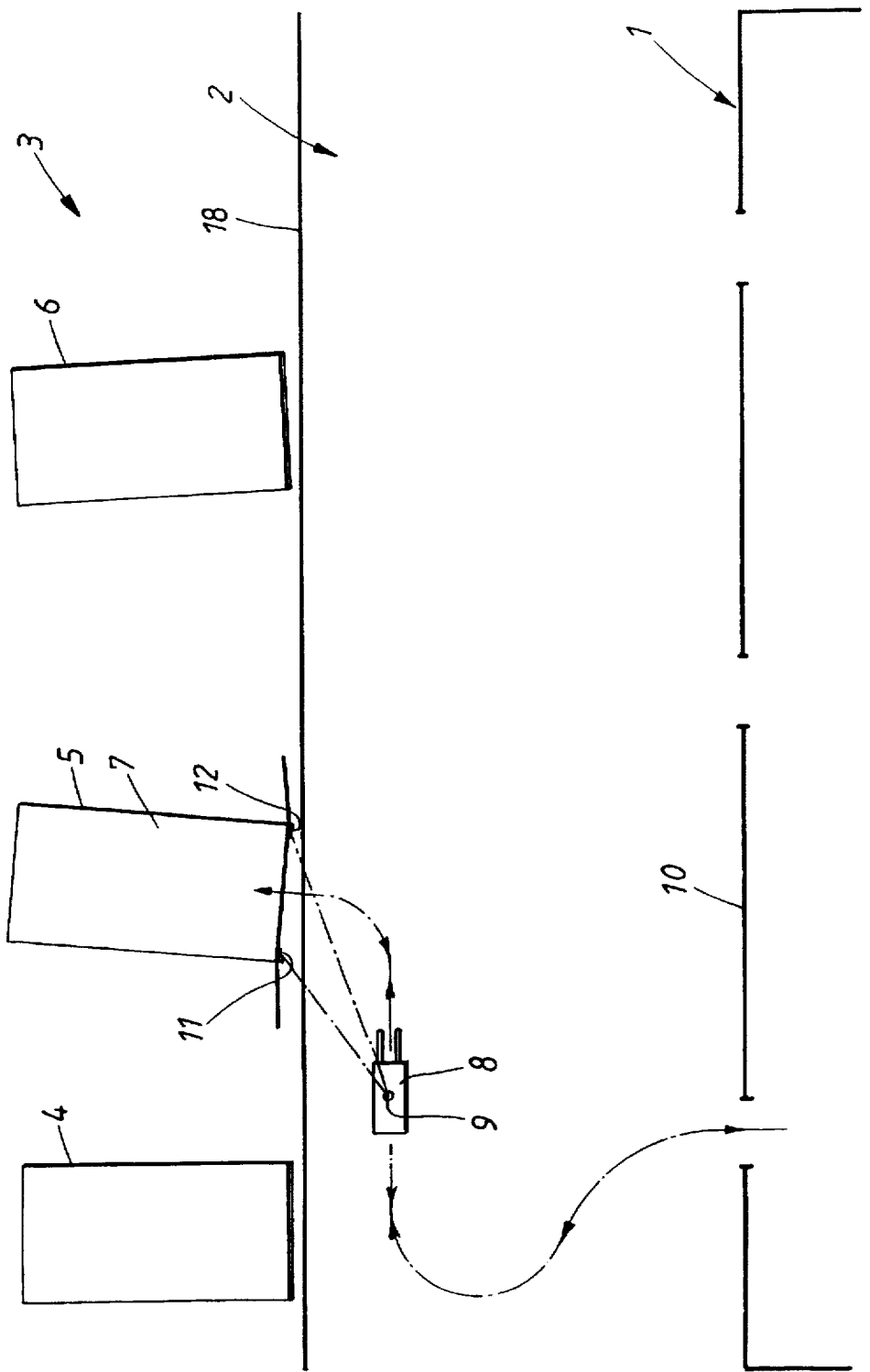
FIG. 1 depicts a schematical view of a cargo transshipment terminal at which the method and device according to the invention is utilized.

The example shown in FIG. 1 is a cargo trans-shipment terminal which in the known way comprises a warehouse 1 for loading in or out of general cargo and, in front of the warehouse, preferably level with the warehouse floor, a fixed work area in the shape of a loading platform 2 and a loading ramp 20, on a level which is elevated relative to a parking area 3 for mobile load-carrying units 4, 5, 6, e.g. containers. The latter are parked so that the loading area 7 of each container is located substantially at the same level as the terminal work area 2. The plant comprises one ore more Automatically Controlled Vehicles (AGV) 8, which are arranged to move, without being manned, between the warehouse 1 and the appropriate load-carrying unit 5, to be loaded or unloaded. The AGV control and navigating system as indicated generally in FIG. 1 at reference "N", is of a kind generally known and is using reference points without identities in the vicinity of the AGV for its navigation of AGV within its activity area. One example of such a system is described in the Swedish Patent Application with the publication No 451 770. The system utilizes for example a rotating laser 9 located on the AGV, sweeping across the work areas of the AGV substantially in a plane parallel to the AGV transportation plane, such as the fixed work area or space 2 or the mobile work area or space 7. Inside these work areas or spaces 2, 7, the AGV may thus move automatically and perform loading or unloading work or other activities. Adjacent to the fixed work area or space 2, for example inside and outside the wall 10 of the warehouse 1, reference instruments lacking identity, thus being void of any identity of their own, are located, e.g. in the shape of simple reflectors, aiding in the AGV navigation across the work area 2.

Figure 2:
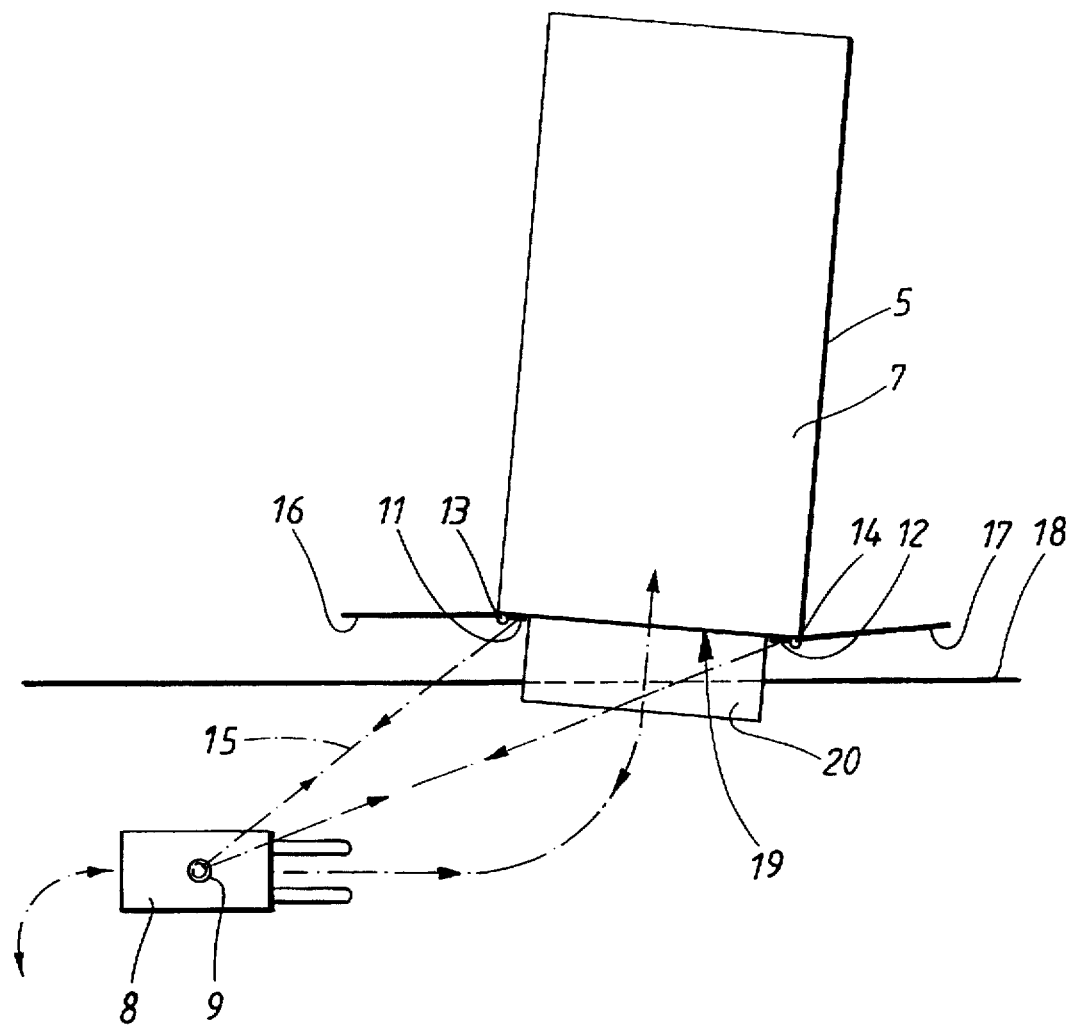
FIG. 2 depicts, in an enlarged view, an AGV unit and a load-carrying unit during on-going loading or unloading.

For the transfer of the AGV between the various work areas or spaces, i.e. the terminal loading area 2 and that mobile loading area 7 which is presently to be loaded or unloaded, a method and a device is provided according to the invention, consisting of the AGV itself determining the position and orientation of the other room relative to the room in which the AGV is located whilst still being inside its first work area 2, i.e the terminal loading area, with the help of at least two reference instruments 11, 12 without identity, belonging to the mobile load carrier 5, i.e being in fixed positions relative to the loading area 7. The selected example shows two reference instruments, which in principle will function, however, in practice, three or more reference instruments are recommended. As is more clearly seen from FIG. 2, the reference instruments 11, 12 may be arranged in connection with the hinges 13, 14 for the doors 16, 17 of the load carrier 5. When the doors are closed, the reference instruments 11, 12 are blanked off, so that the navigation device of the AGV 8 will not detect said instruments 11, 12. In the chosen example with an optical laser and reflectors as reference instruments, the laser 9 located on the AGV 8 emits a sweeping beam, whereby the detection occurs by reflection in the reference instruments 11, 12, which have a suitable location and extension in height such that the sweeping beam will hit the identity-less reflectors. The navigation system computer measures repeatedly, while in motion towards the mobile load carrier, the angles to the reflectors at the moment of reflection, from which data the position and orientation of the load carrier/space is determined at regular intervals and the AGV is controlled in relation to the now known position of the mobile load carrier.

Control of the AGV for transfer from the fixed work area or space 2 to the mobile work area or space 7 is based on a calculation by the navigation system of the position of the mobile work area 7 relative to the fixed work area 2 in regard to distance and angle. The system bases the AGV navigation within the fixed work area 2 on a fixed coordinate system, whereas the reference instruments 11, 12 define a different coordinate system, fixedly related to the mobile work area 7. Through the knowledge of the AGV about the position and angle of the load carrier unit in the coordinate system of the fixed work area when said reference instruments 11, 12 are detected, the known relative position and angle entails that both coordinate systems may be fixed relative to each other and a driving route to the mobile work area 7 may be selected.

In the chosen example, the detection of the reference instruments 11, 12 is only taking place with a load carrier present, and, furthermore, only with open doors 16, 17, whereby it is guaranteed that the container 5 is in place.

In accordance with the invention, the AGV 8 is thus detecting the position of the mobile work area relative to the fixed work area before entry into the mobile area, whereby the AGV entry can be prepared depending on the container position and the character of the task. Consequently, this means that there will be no higher demands on the position of the mobile work area 7 relative to the fixed work area than for manually controlled loading. In the shown example, the transfer of the AGV to the container 5 during loading and unloading takes place across the loading edge 18 of the fixed work area, i.e across its boundary, in the direction of the opening 19 of the container 5, whereby the position of the mobile work area is detected in sequence, i.e continuously or at close intervals, by means of the reference instruments 11, 12, for directing the AGV along a suitably selected route 21 so that the AGV is able to calculate an optimal movement across the mobile work area 7. The AGV thus moves into and out of the load carrier unit 5 along a route determined by a control program in dependence of the relative positions of the two spaces.

When moving from the mobile area.7 to the fixed work area 2, the AGV 8 is able, according to an advantageous embodiment, to make a verifying calculation of the relative positions of the work areas when in position within the mobile area, by detecting also those reference instrument without identity which belong to the fixed area. In this way, the route of the AGV may be adapted to any change in relative position of the mobile work area while the work is in progress.

The invention is not limited to the embodiment example described above and depicted by the drawings, but may be varied within the scope of the enclosed patent claims. For example, distance measurements to at least two reference instruments without identity may be made, or, alternatively, a combination of angle and distance measurement. As an example, the invention may principally be applied to any field of application, where an AGV is performing an activity during which a transfer is necessary between different spaces, work areas or structures, which have no fixed relationship to each other regarding longitudinal, lateral and angular position. The activity may for example be surveillance, operating in dangerous environments and all kinds of load handling in harbours, railway terminals, road transport terminals, air terminals etc. The number of spaces may vary from two up to a substantial number of fixed and mobile spaces. The number of AGV may vary from a minimum of one to a plurality of AGV. The work areas or spaces do not necessarily have to be located at a distance from each other, but may overlap, or the second work area (or areas) may be located completely within the boundaries of the first one. As stated above, the system will in principle be able to operate with two reference instruments, but in practice an improved precision is achieved by using three or more reference instruments for each work area. For the sake of clarity, we have schematically shown a simple straight-edged loading platform in the drawings. In practice, extendable bellows type ramps are often used, having an individual loading edge for each loading bay, a design to which the example shown may easily be adapted.

I claim:

1. A method for guiding an AGV over a supporting surface between a stationary work area and a mobile work area, and utilizing a computer-controlled navigation system for determining the relative location of the AGV, said method including the steps of:
   a) detecting from the AGV a first set of reference objects including at least two non-identity instruments arranged in predetermined, fixed locations relative to the stationary work area;
   b) electronically determining the location of the AGV in the stationary work area relative to the location of said first set of reference objects;
   c) detecting from the AGV in the stationary work area a second set of reference objects including at least two non-identity instruments arranged in predetermined, fixed locations relative to the mobile work area;
   d) electronically determining the location of the second set of reference objects of the mobile work area relative to the stationary work area; and
   e) automatically guiding the AGV from the stationary work area to the mobile work area utilizing location information determined in steps (b) and (d).

2. A method according to claim 1, and comprising the step of mounting the second set of reference objects of the mobile work area on hinges of doors cooperating to open and close access to the mobile work area, such that when the doors are open for loading and unloading, said reference objects are exposed and detectable, and when the doors are closed, said reference objects are concealed and undetectable.

3. A method according to claim 2, and comprising the step of mounting a rotating laser on the AGV for detecting said first and second sets of reference objects.

4. A method according to claim 12, and comprising the steps of:
   (f) detecting from the AGV in the mobile work area the first set of reference objects arranged in predetermined, fixed locations relative to the stationary work area;
   (g) electronically determining the location of the AGV in the mobile work area relative to the stationary work area; and (h) automatically guiding the AGV from the mobile work area to the stationary work area utilizing location information determined in step (g).

5. A method for guidance of an AGV for selection of route when passing between different work areas or spaces, within which areas said AGV is mobile, said work areas being separated from each other by means of area boundaries, which at least temporarily are located so as to enable said passing of the AGV, said method utilizing a navigation system for determining the position of the AGV relative to a work area by detecting from the AGV at least two non-identity reference instruments, said method including the following steps:

a) detecting from the AGV a first set of reference objects including at least two instruments having non-identity and having fixed positions relative to a first of said work areas, b) determining the position of the AGV on said first work area relative to the positions of said first set of reference objects, c) detecting from the AGV on the first work area a second set of reference objects including at least two instruments having non-identity and having fixed positions relative to a second of said work areas, d) determining the position of said second work area regarding translation as well as rotation relative to said first work area by said detecting of said second set of reference objects, and e) guiding the AGV during passing across said area boundaries between said first and second work areas.

6. A vehicle guidance system for guiding an AGV over a supporting surface between a stationary work area and a mobile work area, said guidance system comprising:

(a) a first set of reference objects including at least two non-identity instruments arranged in predetermined, fixed locations relative to the stationary work area;

(b) a second set of reference objects including at least two non-identity instruments arranged in predetermined, fixed locations relative to the mobile work area;

(c) object detection means mounted on the AGV for detecting the presence of said first and second sets of reference objects; and (d) computer means connected to said object detection means for electronically calculating the location of the AGV relative to said first and second sets of reference objects, and for controlling movement of the AGV over the supporting surface between the stationary work area and the mobile work area.

7. A vehicle guidance system according to claim 6, wherein the mobile work area comprises a mobile load carrier having cooperating doors mounted on hinges for movement between open and closed positions, and wherein said second set of reference objects comprise reflectors located inside said load carrier such that when the doors are open for loading and unloading, said reference objects are exposed and detectable by said object detection means, and when the doors are closed, said reference objects are concealed and undetectable by said object detection means.

8. A vehicle guidance system according to claim 6, wherein said object detection means comprises a rotating laser.

* * * * *